(12) United States Patent
Ito

(10) Patent No.: US 7,136,332 B2
(45) Date of Patent: Nov. 14, 2006

(54) OPTICAL PICKUP DEVICE

(75) Inventor: Tatsuya Ito, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 551 days.

(21) Appl. No.: 10/650,782

(22) Filed: Aug. 29, 2003

(65) Prior Publication Data

US 2004/0042358 A1 Mar. 4, 2004

(30) Foreign Application Priority Data

Sep. 3, 2002 (JP) ............................. 2002-258184

(51) Int. Cl.
*G11B 7/00* (2006.01)
(52) U.S. Cl. .................................. 369/44.37
(58) Field of Classification Search ............ None
See application file for complete search history.

(56) References Cited

U.S. PATENT DOCUMENTS

| | | | |
|---|---|---|---|
| 5,517,474 A * | 5/1996 | Takamine ............... | 369/44.32 |
| 5,708,635 A * | 1/1998 | Ichiura et al. ............ | 369/44.24 |
| 6,816,450 B1 * | 11/2004 | Miura et al. ............. | 369/112.29 |
| 6,980,504 B1 * | 12/2005 | Yukawa .................. | 369/112.12 |
| 7,035,196 B1 * | 4/2006 | Takasuka et al. .......... | 369/121 |

FOREIGN PATENT DOCUMENTS

| JP | 10-222865 | | 8/1998 |
|---|---|---|---|
| JP | 10222865 A | * | 8/1998 |
| JP | 11-134677 | | 5/1999 |
| JP | 2001-184698 | | 7/2001 |
| JP | 2001-209957 | | 8/2001 |

* cited by examiner

*Primary Examiner*—William Korzuch
*Assistant Examiner*—Adam R. Giesy
(74) *Attorney, Agent, or Firm*—Crowell & Moring LLP

(57) ABSTRACT

An optical pickup device has a semiconductor in which 2 light emitters laser emitting laser beams having different wavelengths for a DVD and CD are mounted on one package and disposes optical-system lenses with reference to a main beam for a DVD such that a long axis of an elliptic beam which is emitted from each light emitter for a CD and DVD and irradiated onto a disc is tilted at about 35° to the radius direction of a disc. This prevents an aberration from being generated in a converging spot at the DVD side due to image height and exhibits sufficient performance of lens to keep all CT, MTF and jitter in comparatively favorable conditions.

3 Claims, 6 Drawing Sheets

FIG. 6

|  | MTF | CT | JITTER |
|---|---|---|---|
| 0° | ○ | × | × |
| 35° | △ | △ | ○ |
| 45° | △ | △ | △ |
| 90° | × | ○ | × |

OPTICAL PICKUP DEVICE

BACKGROUND OF THE INVENTION

1. Field of the Invention

The present invention relates to an optical pickup device for reading information from a plurality of discs having different reading wavelengths, more particularly, to an optical pickup device comprising a semiconductor laser device whose a plurality of light emitters emitting laser beams with different wavelengths were integrated and a photodetector disposed correspondingly.

2. Description of the Related Art

Conventionally, a DVD/CD reproduction device is known which shares each optical pickup device for a CD disc reproduction device and a DVD disc reproduction device, and reads information through different wavelengths to each other.

As can be understood by comparing structures of CD and DVD discs, the thickness of the protective layer for a DVD disc is about one-half that of a CD disc, therefore, where an optical pickup using a monofocal lens reproduces both discs, when an optical beam which is optimum to reproduce a DVD disc is converged on the information recording surface, since the protective layer of a CD disc through which an optical beam is transmitted is larger than that of a DVD disc, a spherical aberration occurs in the optical beam, which does not allow the optimum optical beam to be converged on the information recording surface of a CD disc. Therefore, there is an optical pickup with a biofocal lens which is capable of focusing on different points on the same straight line and irradiating 2 laser beams to form a beam spot corresponding to the size of each information pit.

This kind of optical pickup device comprises a light emitter to emit the laser beam with the optimum wavelength (780 nm) to read information from a CD having a comparatively low recording density and a light emitter to emit the optimum laser beam with the optimum wavelength (650 nm) to read information from a DVD having a high recording density, and alternatively drives and controls either light emitter by discriminating the type of the disc. A reflecting light generated by irradiating an information reading light onto a disc is irradiated onto a photodetector. In this kind of DVD/CD reproducing system requiring 2 light emitters, where either one of the light emitters is irradiated from the surface which is perpendicular to the other one of light emitters, it is necessary to hold a space in which an optical system is disposed, which increases in size of the device.

To prevent this optical pickup device from increasing in size, it is proposed that 2 light emitters emitting laser beams having different wavelengths for a DVD and CD are integrated and by using a semiconductor device emitting a laser beam alternatively and a photodetector corresponding to 2 light emitters, this semiconductor laser device is disposed such that straight lines connecting to each light-emitting point of a plurality of light emitters come in contact with the track tangential line of the disc to be reproduced (for example, refer to Japanese Patent Laid-Open Publication No. 2001-209957 and No. 2001-184698).

In the configurations as shown in the these patent laid-open publications, a plurality of laser beams having different wavelengths can be guided through a single optical path, which allows a compact space. However, more specifically, since the positions of 2 light emitters are different, it is necessary to take those positions to the optical axis of the objective lens into consideration. When the center of the light source does not coincide with the optical axis, the image height is high and some aberration exists. Since this aberration may affect reading signals adversely, it is recommended to reduce it as much as possible. In addition, since the NA of a DVD is larger than that of a CD and on the contrary, the beam spot of a DVD is smaller than that of a CD, the aberration upon reproduction of a DVD is larger than that upon reproduction of a CD regardless of the high image and in addition, the rate of increase in aberration upon reproduction of a DVD is also larger in comparison with that of a CD. Accordingly, the semiconductor laser is configured such that a 650 nm light emitter is disposed on the center axis of the optical system or the distance from the 650 nm light emitter to the center axis of the optical system is smaller than that from a 780 nm light emitter to the center axis of the optical system.

SUMMARY OF THE INVENTION

As mentioned above, in the configuration in which the semiconductor laser device is disposed such that straight lines connecting to the light-emitting points of each of a plurality of light emitters coincide with the track tangential line of the disc to be reproduced, the semiconductor laser device is disposed such that the long axis of an elliptic beam emitted from the semiconductor laser device to be irradiated onto a disc is located at 45° in a radial direction which is perpendicular to the track direction of a disc. In this disposition configuration, although crosstalk (CT) in which adjacent tracks on a disc affect each other and an MTF (Modulation Transfer Function) the pit reading resolution on a track, exhibit comparatively desirable results for reading characteristics, it was found that there is room for improvement regarding jitter as time error at the conversion point.

In addition, in a DVD/CD reproducing device, optical-system lenses are disposed with reference to the main beam of 0th order light at the CD side using 3 beams for tracking, however, this system has a problem in that an aberration occurs in the converging spot at the DVD side due to a high image, preventing lenses from exhibiting sufficient performance.

The present invention is made in consideration of the above problems and it is an object of providing an optical pickup device has a semiconductor laser in which 2 light emitters emitting 2 laser beams having different wavelengths for a DVD and CD is mounted in one package, a photodetector corresponding to 2 light emitters and an optical system for guiding a leaser beam to said photodetector, to eliminate generation of aberration on the converging spot at the DVD side due to a image height, to exhibit sufficient performance of lenses and to keep all CT, MTF and jitter in comparatively favorable conditions.

According to an aspect of the present invention, an optical pickup device, which reads information recorded on a CD and DVD disc using laser beams having wavelengths corresponding to each disc, comprises: a semiconductor laser having a plurality of light emitters emitting laser beams having different wavelengths selectively; a photodetector which receives said laser beams; and an optical system which guides laser beams reflected by said discs into said photodetector as well as guides said laser beam emitted from said semiconductor laser into said discs; wherein said optical system includes an astigmatism element giving an astigmatism to said laser beam, a diffraction element generating a pair of sub-beams for tracking control of a CD in addition to main-beams from said laser beam, and lenses converging laser light; wherein said photodetector includes a multi-separation photoreceptor installed respectively corresponding to a plurality of laser beams having different wavelengths and a pair of sub-beams photoreceptors; and wherein lenses of said optical system are disposed with reference to the main beam for a DVD.

Preferably, in the optical pickup device, said semiconductor laser is disposed such that a long axis of an elliptic main beam which is emitted from each light emitter for a CD and a DVD and is irradiated on a disc is located at about 35°±5° in a radius direction of the corresponding disc (in case that defined as 0° when the long axis is in the radius direction and 90° when it is in a track direction); and wherein each separation photoreceptor for a CD and DVD of said photodetector is disposed such that the irradiation position of said each main beam onto a reproduction disc comes in contact with a line tilted to the direction perpendicular to the track tangential line.

According to another aspect of the present invention, an optical pickup device, which reads information recorded on a CD and DVD disc using laser beams having wavelengths corresponding to each disc, comprising: a semiconductor laser having a plurality of light emitters emitting laser beams having different wavelengths selectively; a photodetector which receives said laser beams; and an optical system which guides laser beams reflected by said discs into said photodetector as well as guides said laser beam emitted from said semiconductor laser into said discs; wherein said optical system includes an astigmatism element giving an astigmatism to said laser beam, a diffraction element generating a pair of sub-beams for tracking control of a CD in addition to main-beams from said laser beam, and lenses converging laser light; wherein said photodetector includes a multi-separation photoreceptor installed respectively corresponding to a plurality of laser beams having different wavelengths and a pair of sub-beams photoreceptors; wherein lenses of said optical system are disposed with reference to the main beam for a DVD; wherein said semiconductor laser is disposed such that a long axis of an elliptic main beam which is emitted from each light emitter for a CD and DVD and is irradiated on a disc is located at about 35°±5° in a radius direction of the corresponding disc (in case that defined as 0° when the long axis is in the radius direction and 90° when it is in a track direction); wherein said optical system operates such that the alignment direction of the three beams which are composed of a main beam and a pair of sub-beams by said diffraction element comes in contact with the track tangential line of the disc to be reproduced and the irradiation position of said each main beam onto a reproduction disc comes in contact with a line tilted at about 10° to the direction perpendicular to the track tangential line; and wherein each separation photoreceptor for a CD and DVD of said photodetector is disposed such that the irradiation position of said each main beam onto a reproduction disc is tilted to the direction perpendicular to the track tangential line.

Preferably, in the optical pickup device, the separation photoreceptor of said photo detector is separated into four sections.

In the present invention, in an optical pickup system which uses a semiconductor laser having 2 light emitters emitting laser beams with different wavelengths for a DVD and CD, a photodetector corresponding to these light emitters, and an optical system, optical-system lenses are disposed with reference to a main beam for a DVD, and the semiconductor laser device is disposed such that the long axis of an elliptic beam is located at 35° in a radial direction of the disc, based on the above configuration, a photoreceptor of the photodetector is disposed in response to change in a emitted position of each main beam onto the reproducing disc, which prevents an aberration from being generated in a converging spot at the DVD side due to a high image to exhibit sufficient performance of lenses and to obtain favorable characteristics generally in CT, MTF and jitter.

BRIEF DESCRIPTION OF THE DRAWINGS

FIG. 6 is a diagram showing evaluation of characteristics regarding MTF, CT and jitter when an angle of a beam emitted from the semiconductor laser is changed.

DESCRIPTION OF THE PREFERRED EMBODIMENTS

Embodiments of the present invention are hereinafter described with reference to samples of optical pickup devices to reproduce information recording media such as a DVD, CD or CD-R. The information recording media to be reproduced are not limited to the above-mentioned ones and this invention may be applied to devices to reproduce a plurality of discs having different wavelengths.

Figure 1:
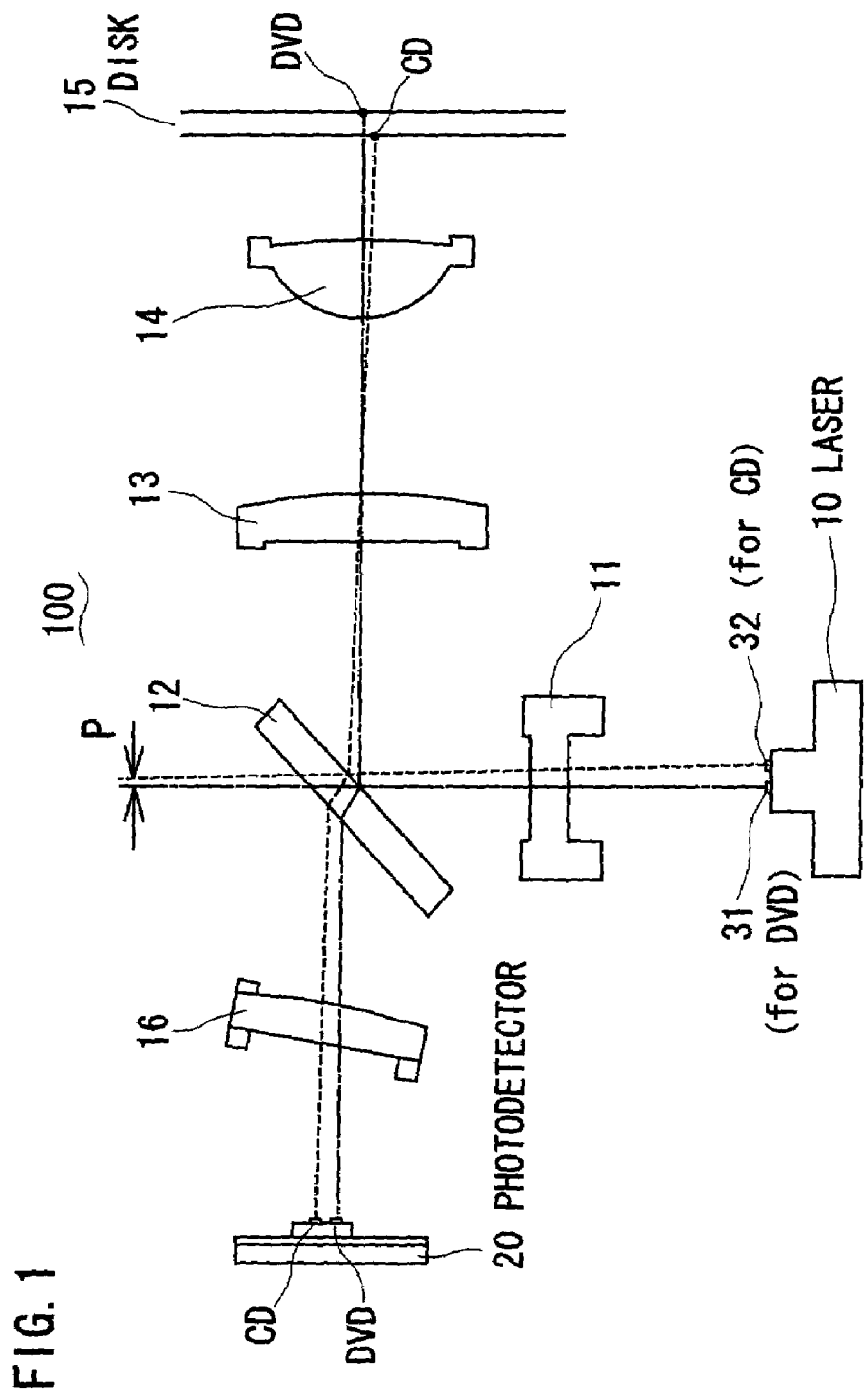
FIG. 1 is a configuration diagram of an optical pickup device according to an embodiment of the present invention.
Figure 2:
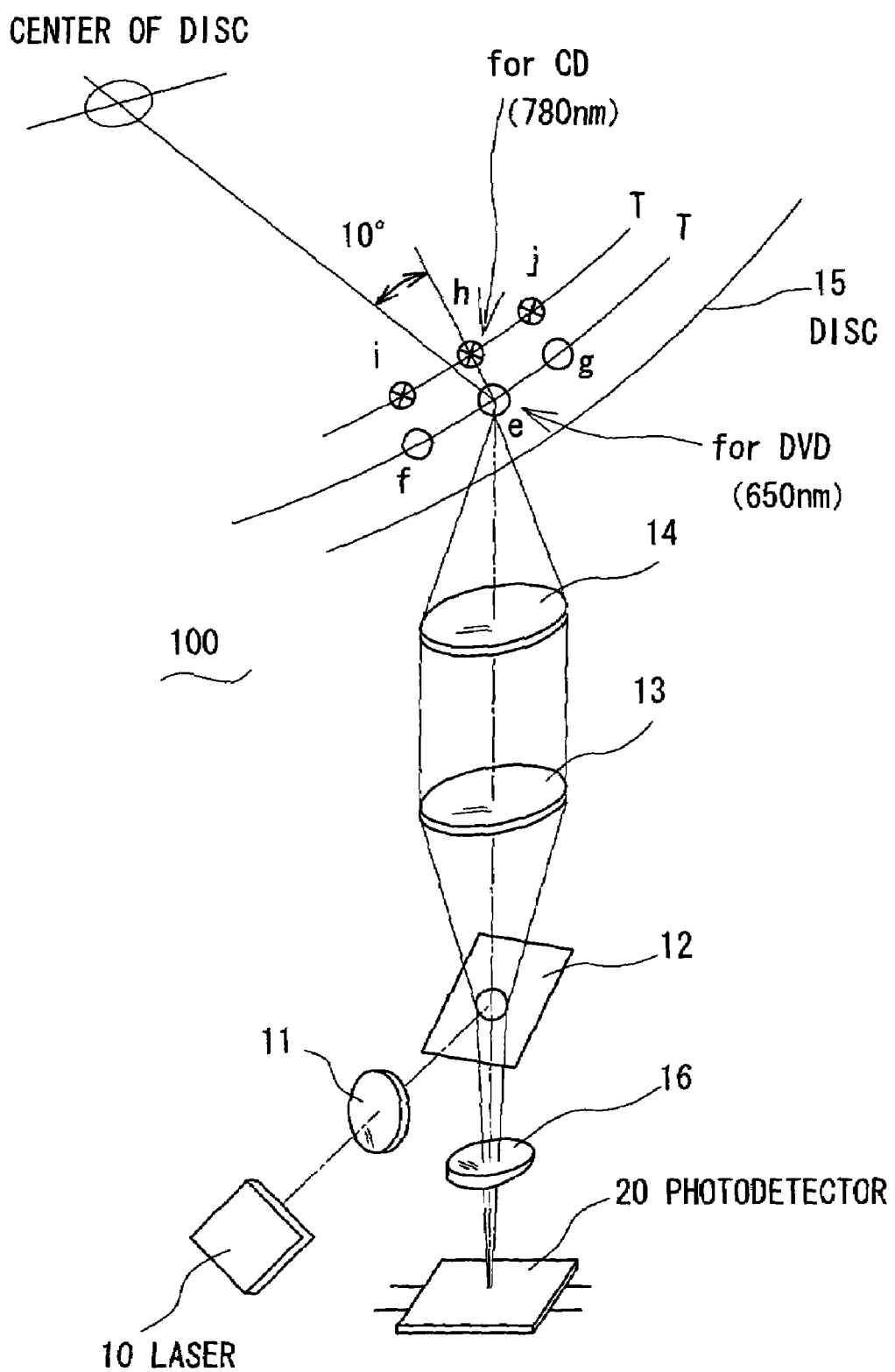
FIG. 2 is a schematic perspective view of the optical pickup device according to an embodiment of the present invention.

FIG. 1 and FIG. 2 show an optical system of an optical pickup device 100 according to an embodiment. The optical pickup device 100 is composed of a semiconductor laser 10 emitting laser beams with 2 different wavelengths as emitting means, a diffraction grating 11 generating a pair of sub-beam from the laser beam, a half mirror 12 transmitting the laser beam reflected from a information recording surface of a disc 15, a collimator lens 13 converting a laser beam to a parallel beam, a bifocal objective lens 14 converging at different points on the same straight line and forming s proper size of a beam spot with reference to size of each information pit, a cylindrical lens 16 which is an astigmatism element providing a laser beam with an astigmatism and a photodetector 20 which is an optical detecting means receiving a laser beam. In these embodiments, focus adjustment are performed according to the astigmatism method, tracking servo adjustment is performed to a CD according to the three-beam method and to a DVD only using a main beam.

A semiconductor laser element 10 is a one-chip laser diode emitting a laser beam for reading a CD and CD-R, whose wavelength is 780 nm and a laser beam for reading a DVD, whose wavelength is 650 nm. This semiconductor laser element 10 has a 650 nm light emitter 31 emitting a laser beam with 650 nm wavelength (hereinafter referred to as "1st laser beam") and a 780 n light emitter 32 emitting a laser beam with 780 nm wavelength (hereinafter referred to as "2nd laser beam"). The 650 nm light emitter 31 and the 780 nm light emitter 32 are formed with approx. 100 nm intervals.

In the semiconductor laser element 10 used for the optical pickup device 100 according to the embodiment, the 650 nm light emitter 31 for the 1st laser beam (light emitter for a DVD) and the 780 nm light emitter 32 for the 2nd laser beam (light emitter for a CD) are formed on the one chip with just only approx. 100 nm intervals. Although this enables a configuration corresponding to a beam splitter which has been conventionally required to be eliminated, more specifically, since the positions between 2 light emitters 31 and 32 are different, as described below, it is necessary to resourcefully dispose the optical-system lenses and 2 light emitters 31 and 32 to the optical axis of the optical lens particularly.

Namely, for the image height and aberration of the semiconductor image element, the NA (Numerical Apeture) for a DVD but is larger than that for a CD, the beam spot diameter for a DVD is smaller than that for a CD, therefore, the aberration upon reproduction of a DVD is comparatively larger than that upon reproduction of a CD regardless of image height. Accordingly, the semiconductor laser element used for optical pickup device 100 according to the embodiment is disposed such that the light emitter 31 for a DVD is located on the central axis of the optical system. In another words, the optical-system lenses are disposed with reference to the main beam emitted from the light emitter 31 for a DVD.

In addition, to keep each crosstalk (CT) and MTF (Modulation Transfer Function) in favorable conditions as an index to the evaluation of reading characteristics of the optical pickup device 100 in favorable conditions, it is necessary to dispose the semiconductor laser element 10 such that the elliptic beams emitted from the light emitters 31, 32 for a DVD and CD which are irradiated on a disc 15 is located at a proper angle to the track direction of the corresponding disc 15.

Figure 3:
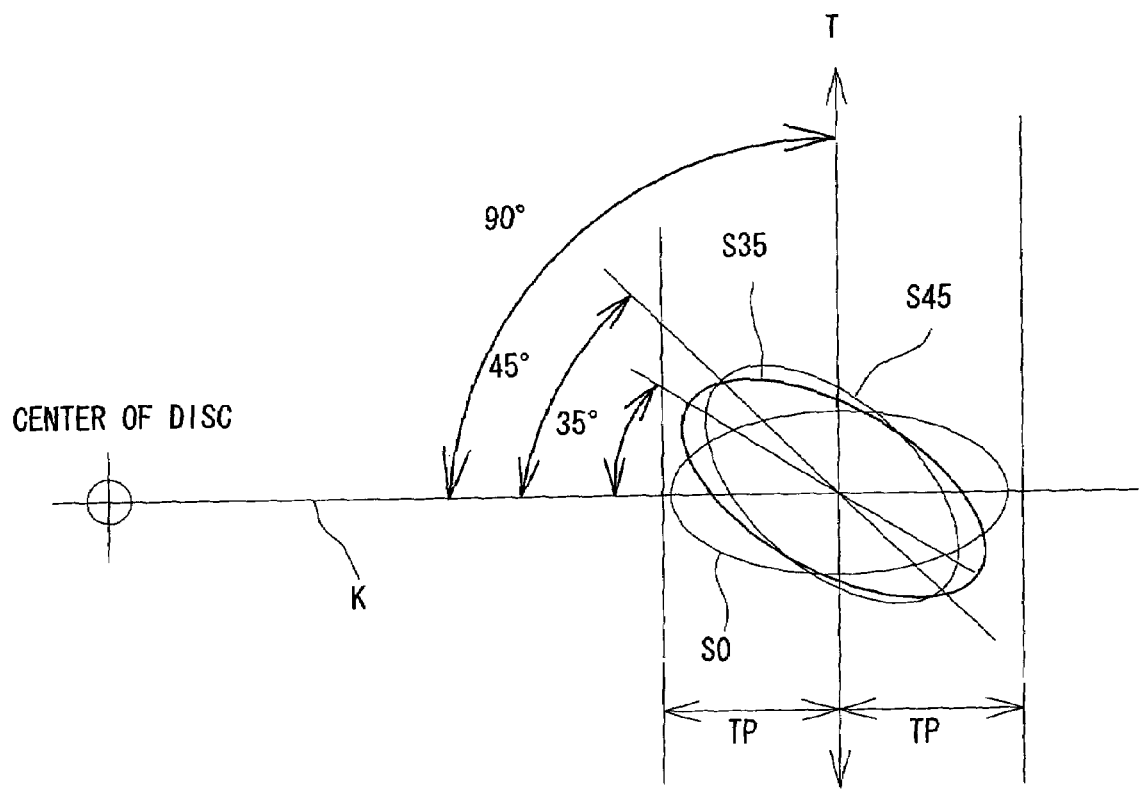
FIG. 3 is a drawing showing the relationship between a beam emitted from a semiconductor laser and a disc track of the optical pickup device according to an embodiment of the present invention.

This issue is now described in more detail with reference to FIG. 3. FIG. 3 shows the state in which the long axis's direction (angle) of the elliptic beam irradiated onto the disc 15 varies. TP shows a track pitch of an adjacent track T, K shows a direction of a radius which passes through the center of a disc. S0, S35 and S45 show elliptic beams with the long axes at each angle. (Defined as 0° with long axis in a radius direction and as 90° with long axis in Track's T direction). The DVD case is described as above, however, in the CD case, the size in TP (Track Pitch) and elliptic beam is slightly larger. Usually, the semiconductor laser element is disposed such that the long axis of the elliptic beam to be irradiated onto a disc is located at 45° in the radius direction "K" of the corresponding disc (elliptic beam S45). More specifically, the DVD's TP (Track Pitch) according to the present embodiment is 0.74 μm, the NA is 0.6, the dimensions in the long axis of the elliptic beam is 1.07 μm and the dimensions in the short axis is 0.89 μm, while the CD's TP (Track Pitch) is 1.6 μm, the NA is 0.45, the dimensions in the long axis of the elliptic beam is 1.7 μm and the dimensions in the short axis is 1.42 μm.

When the angle of the long axis's direction of the aforementioned elliptic beam is changed from 45° to around 35°, the experimental results now judge that favorable characteristics can be obtained (the elliptic beam S35) (described in detail hereinafter). Therefore, the semiconductor laser element 10 according to the invention is disposed such that the long axis of the elliptic beam (main beam) to be irradiated onto the disc 15 is located at around 35° in the radius direction K of the disc 15. Moreover, as shown in FIG. 1, the lenses are disposed with reference to the optical axis from the light emitter 31 for a DVD. In this case, a relative misalignment angle "p" of the emitting optical axis of the light emitter 32 for CD to the emitting optical axis of the light emitter 31 for a DVD is designed to be 10 min<p<20 min.

Where the semiconductor laser element 10 is disposed as described above, described below is the state of the beam spot which is emitted from the same laser and irradiated onto the reproducing disc 15 and the optical-system configuration suitable for the above state. As shown in FIG. 2, the optical system is disposed such that both the alignment direction of 3 beams composed of a main beam "e" and a pair of sub-beams "f" and "g" (not to be used actually) emitted from the light emitter 31 for a DVD through the diffraction grating, 11 and the alignment direction of 3 beams composed of a main beam "h" and a pair of sub-beams "i" and "j" (to be used for tracking) emitted from the light emitter 32 for a CD through the diffraction grating, 11 come in contact with the track tangential line of the reproducing disk 15. And at this time, as shown in FIG. 2, the irradiation points of the main beams "e" and "h" irradiated onto the reproducing disc 15 from each light emitter 31 and 32 for a DVD and CD is tilted by around 10° to the direction perpendicular to the track tangential line. This is based on the fact that the semiconductor laser element 10 was disposed such that the long axis's direction (angle) of the elliptic beam to be irradiated onto the disc 15 was changed from 45° to 35°. Moreover, the diffraction angle α of sub-beam "i", "j" (±primary light) is 2 [deg]<α<2.5 [deg].

Figure 4:
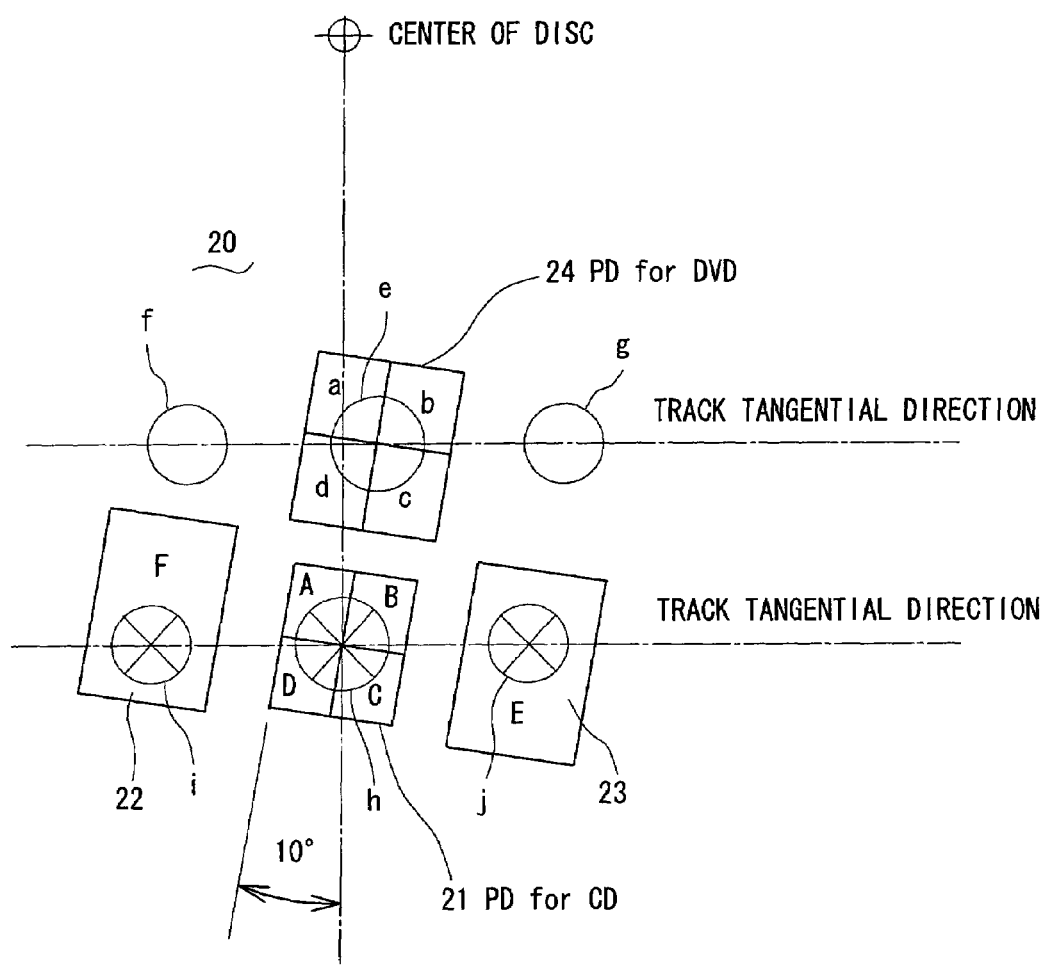
FIG. 4 is a drawing showing a layout of a photoreceptor on a photodector of the optical pickup device according to an embodiment of the present invention.

It is necessary to also change the layout of the photo receiving portion of the photodetector 20 according to the irradiation position of the beam spot onto the reproducing disc 15 as described above. FIG. 4 shows the layout of the photoreceptors for a CD and DVD of the photodetector 20 according to the embodiment with reference to the correspondence to the beam spot on the disc. The photodetector 20 according to the embodiment is designed to detect a focus error signal by the astigmatism method and a tracking error signal using 3 beams other than reading signals and to apply the tracking servo method to CD using 3 beams. In general, a photodetector judges the presence/absence of pits recorded onto a disc according to amount of reflected light and the total light amount is obtained by the light amount per unit area and photo receiving area. When a beam spot is formed on a pit, a laser beam irradiated onto the pit surface is diffusely reflected, which decreases the reflecting light amount and gets dark and causes the receiving light amount to be reduced.

More specifically, as shown in FIG. 4, the photodetectors 20 are disposed both at a 4-separation photoreceptor 21 (A, B, C and D) onto which the main beam "h" is irradiated to generate reading signals for a CD and around a track tangential direction of the same separation photoreceptor 21, which have a pair of photoreceptors 22 and 23 (F and E) onto which the sub-beams "i" and "j" are irradiated to generate a tracking error signal and a 4-separation photoreceptor 24 (a, b, c and d) onto which the main beam "e" is irradiated to generate a focus error signal and tracking error signal as well as a reading signal for a DVD. When 3 laser beams for a DVD are irradiated onto the photodetector 20, the beam spot of the main beam "e" are received by the 4-separation photoreceptor 24, 2 sub-beams "f" and "g" are not used. In addition, when 3 beams as a laser beam for a CD are irradiated, the beam spot of the main beam "h" is received by the 4-separation receiving portion 21 and the beam spots of the 2 sub-beams "i" and "j" are received by sub-beam photoreceptors 22 and 23. Furthermore, it is necessary for the sub-beam photoreceptors 22 and 23 to receive 2 kinds of sub-beams having different receiving positions, which causes its size to be larger than that of the 4-separation photoreceptor 21.

The aforementioned 4-separation photoreceptors 21 and 24 are disposed so as to be tilted at around 10° to the direction perpendicular to the track tangential direction corresponding to the state in which the irradiation positions of each main beam "h" and "e" onto the reproducing disc come in contact with the line tilted at 10° to the direction perpendicular to the track tangential direction. As described above, it becomes possible to perform the focus servo adjustment by means of the astigmatism when reproducing a DVD at the 1st laser beam and reproducing a CD by means of the 2nd beam without problems by disposing the separation photoreceptors 21 and 24 of the photodetectors 20. Known configurations may be used for calculation to generate various signals by detection signals from the photodetector 20.

In the optical pickup system 100 as configured above, when a DVD or CD disc is produced, the laser beams emitted from the corresponding light emitter 31 or 32 of the semiconductor laser element 10 is partially reflected by a half mirror 12 through the diffraction grating 11 and turns to be a parallel beam by the collimator 13 and then a beam spot is formed on the track of the information recording surface of the disc 15 by operation of the objective lens 14. In addition, the return light of the laser beam reflected by the information recording surface of the disc passes through the objective lens 14 and the collimator lens 13 and its part of it is transmitted by the half mirror 12, and passes through the cylindrical lens 16 and is converged on the 4-separation photoreceptor 24 or 21 of the photodetector 20. Moreover, it is designed to suppress a spherical aberration caused by difference in surface substrates of a DVD and CD.

In particular, described hereinafter with reference to FIG. 5 is each characteristic of MTF, crosstalk and jitter when changing the angle in the long axis's direction of the elliptic beam on the disc determined by the position of the semiconductor laser element 10. Although this diagram shows the experiment results for a DVD, the similar results are expected for a CD. Moreover, the optical pickup device 100 discriminates a disc type by known methods in advance and is controlled such that either light emitter of the semiconductor laser 10 is driven according to the disc discrimination results.

Figure 5A:
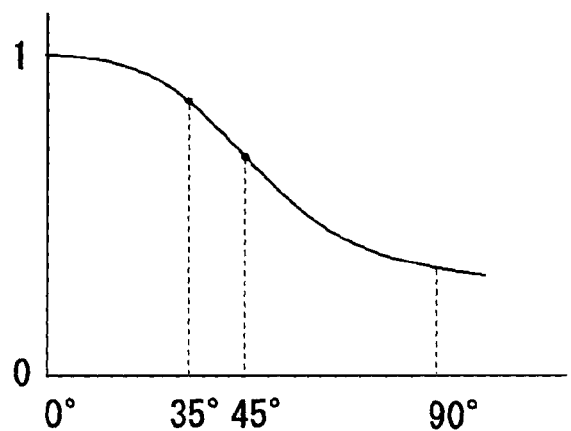
FIGS. 5A, 5B and 5C are diagrams showing characteristics regarding MTF, CT and jitter when an angle of a beam emitted from the semiconductor laser is changed.
Figure 5B:
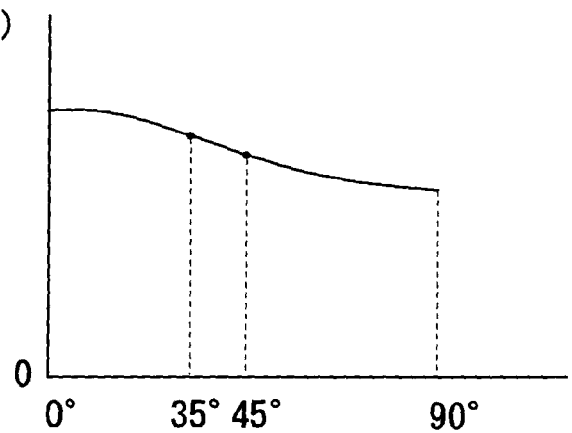
Figure 5C:
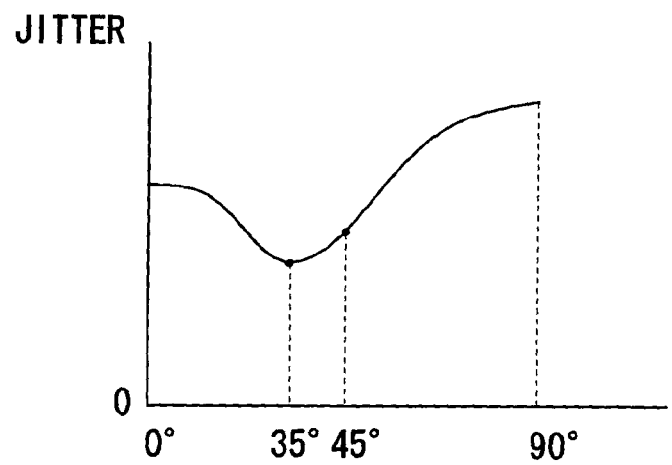

As shown in FIG. 5A, the MTF exhibits the optimum results with the above angle at 0° and the worst results with the above angle at 90°. Meanwhile, as shown in FIG. 5B, the crosstalk (CT) exhibits the optimum results with the above angle at 90° and the worst results with the angle at 0°. For this purpose, conventionally, the in-between angle 45° is applied to the above angle. However, for jitter characteristics, as shown in FIG. 5C, it exhibits the optimum results with the above angle at around 35°. Furthermore, the MTF and crosstalk (CT) data under the above conditions compare favorably with those at 45°.

Figure 6:
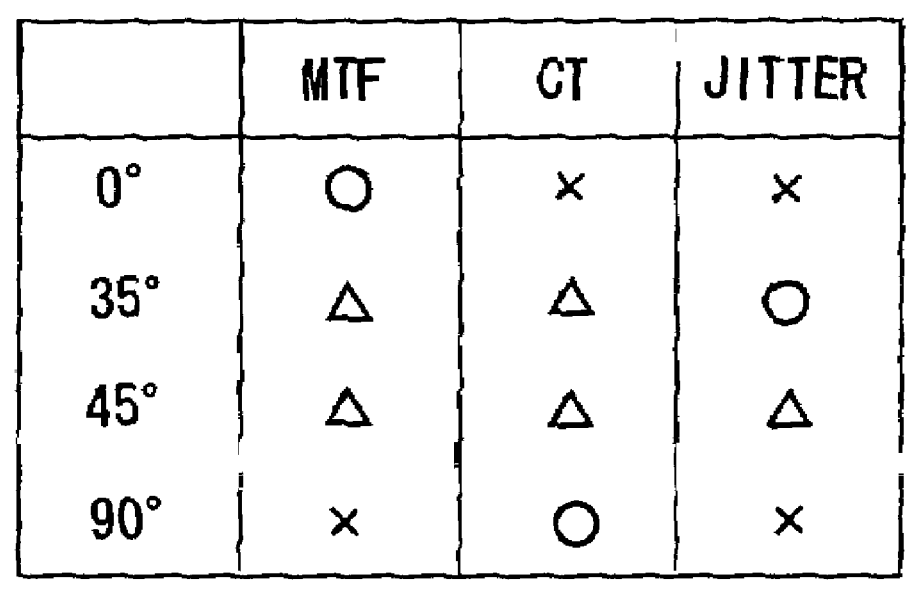

Based on the above results, when the compliance of each characteristic for MTF, CT and jitter at each angle is judged, the results are as shown in FIG. 6 (○: acceptable, X: unacceptable, Δ: intermediate). As a result, it is preferable that the semiconductor laser element 10 is disposed such that the angle in the disc's radius direction of the long axis of the elliptic beam (main beam) to be irradiated onto the disc 15 is approximately 35°.

As described above, in the optical system according to the present embodiment which has the semiconductor laser element 10 in which the light emitter 32 emitting the laser beam with the wavelength for reading a CD and CD-R and the light emitter 31 emitting the laser beam with the wavelength for reading a DVD are mounted in one package, and the photodetector 20 having the photoreceptors 21 and 24 respectively corresponding to 2 light emitters, a favorable result of each characteristic for MTF, crosstalk and jitter upon reproduction of both a CD and DVD can be obtained in general by disposing the lenses with reference to the main beam from the light emitter 31 for a DVD and disposing the semiconductor laser element 10 and the photodetector 20 such that the angle of the long axis of the elliptic beam which is emitted from the semiconductor element 10 and irradiated onto the disc is approximately 35° to the direction perpendicular to the track tangential line.

The application of this invention is not limited to the configurations described in the foregoing embodiment but is widely to various configurations. For example, known methods may be used for the tracking servo method. In addition, for the 4-separation photoreceptors 24, 21 of the photodetector 20, any multiple-separation photoreceptor may be employed without being limited to this. The present embodiment describes the case where the long axis of the elliptic beam which is emitted from the semiconductor laser and irradiated onto the disc is located at 35° in the radius direction of the disc. However, even in the range of around the above angle ±5°, desirable results can be obtained. This invention also includes this range.

This application is based on Japanese Patent Application No. 2002-258184 filed in Japan dated Sep. 3, 2002, the contents of which are hereby incorporated by references.

What is claimed is:

1. An optical pickup device, which reads information recorded on a CD and DVD disc using laser beams having wavelengths corresponding to each disc, comprising:
   a semiconductor laser having a plurality of light emitters emitting laser beams having different wavelengths selectively;
   a photodetector which receives said laser beams; and
   an optical system which guides laser beams reflected by said discs into said photodetector as well as guides said laser beam emitted from said semiconductor laser into said discs;
   wherein said optical system includes an astigmatism element giving an astigmatism to said laser beam, a diffraction element generating a pair of sub-beams for tracking control of a CD in addition to main-beams from said laser beam, and lenses converging laser light;
   wherein said photodetector includes a multi-separation photoreceptor installed respectively corresponding to a plurality of laser beams having different wavelengths and a pair of sub-beams photoreceptors;
   wherein lenses of said optical system are disposed with reference to the main beam for a DVD;
   wherein said semiconductor laser is disposed such that a long axis of an elliptic main beam which is emitted from each light emitter for a CD and a DVD and is irradiated on a disc is located at 35°±5° in a radius direction of the corresponding disc which is defined as 0° when the long axis is in the radius direction and 90° when it is in a track direction;
   and wherein each separation photoreceptor for a CD and DVD of said photodetector is disposed such that the irradiation position of said each main beam onto a reproduction disc comes in contact with a line tilted to the direction perpendicular to the track tangential line.

2. An optical pickup device, which reads information recorded on a CD and DVD disc using laser beams having wavelengths corresponding to each disc, comprising:
- a semiconductor laser having a plurality of light emitters emitting laser beams having different wavelengths selectively;
- a photodetector which receives said laser beams; and
- an optical system which guides laser beams reflected by said discs into said photodetector as well as guides said laser beam emitted from said semiconductor laser into said discs;
- wherein said optical system includes an astigmatism element giving an astigmatism to said laser beam, a diffraction element generating a pair of sub-beams for tracking control of a CD in addition to main-beams from said laser beam, and lenses converging laser light;
- wherein said photodetector includes a multi-separation photoreceptor installed respectively corresponding to a plurality of laser beams having different wavelengths and a pair of sub-beams photoreceptors;
- wherein lenses of said optical system are disposed with reference to the main beam for a DVD;
- wherein said semiconductor laser is disposed such that a lone axis of an elliptic main beam which is emitted from each light emitter for a CD and a DVD and is irradiated on a disc is located at 35°±5° in a radius direction of the corresponding disc in case that defined as 0° when the long axis is in the radius direction and 90° when it is in a track direction);
- wherein said optical system operates such that the alignment direction of the three beams which are composed of a main beam and a pair of sub-beams by said diffraction element comes in contact with the track tangential line of the disc to be reproduced and the irradiation position of said each main beam onto a reproduction disc comes in contact with a line tilted at about 10° to the direction perpendicular to the track tangential line;
- and wherein each separation photoreceptor for a CD and DVD of said photodetector is disposed such that the irradiation position of said each main beam onto a reproduction disc is tilted to the direction perpendicular to the track tangential line.

3. The optical pickup device according to claim 2, wherein the separation photoreceptor of said photodetector is separated into four sections.

* * * * *